Oct. 11, 1966 G. E. FENNER 3,278,686

FM STEREO ADAPTER HAVING NEGATIVE RESISTANCE OSCILLATOR MEANS

Filed Oct. 17, 1963

Inventor:
Gunther E. Fenner,
by John F. Ahern
His Attorney.

3,278,686

FM STEREO ADAPTER HAVING NEGATIVE RESISTANCE OSCILLATOR MEANS

Gunther E. Fenner, Schenectady, N.Y., assignor to General Electric Company, a corporation of New York Filed Oct. 17, 1963, Ser. No. 316,862
5 Claims. (Cl. 179—15)

This invention relates to means for separating at the receiver end of a communication system stereo information signals which were mixed in a predetermined manner at the transmitter end of the system.

The Federal Communications Commission (FCC) has approved a method for transmission of two information channels by radio stations using the commercial frequency modulation (FM) band of alloted frequencies. The method preserves to the owner of an older FM receiver full utility for his apparatus while allowing someone interested in more realistic reception to purchase an adapter for the original equipment, or new equipment, which permits two or more speakers to be used which closely approximate the directivity of sound at the originating station (or recording booth in the case of a record). This reception, which reconstitutes at the receiver sound directivity as occurring when originally recorded, has come to be known in the art as "stereo reception" and will be so referred to hereinafter.

One of the two information channels, of the aforementioned approved method for transmission, is broadcast in the form of a double sideband, suppressed carrier signal. This channel is spaced in frequency from the other information channel, used to convey a conventional signal to consumers having the single direction, or "monaural," receivers. In order to derive information from the suppressed carrier sidebands needed for stereo reception it is necessary to provide a carrier frequency signal generation and insertion circuit, as is well-known in the art. The generated carrier must conform closely, not only in frequency, but also in time relationship, or phase, to the original carrier that was suppressed. To this end, a relatively small amplitude synchronizing, or pilot, signal is introduced into the broadcast signal for the purpose of ensuring generation of a carrier signal at the receiver which very closely approximates in frequency and phase the original carrier signal.

The pilot signal is broadcast intermediate the two information channels, which are closely spaced in frequency on either side thereof. For optimum reception it is necessary to detect, or extract, the pilot signal with minimum disturbance of the two information channels. Departures in amplitude or phase introduced by the receiver between the two information channels seriously adversely affect stereo reception. The detrimental affect is known in the art as a reduction in channel separation.

Suitable means for extracting the pilot signal without introducing these undesirable effects are known and used extensively in many applications wherein cost is relegated to a minor role when compared with performance. The cost of such signal extraction means would normally approximate, and frequently surpass, the cost of the remainder of an FM stereo receiver produced for the consumer market. Thus, it would be highly desirable to provide a pilot signal extraction and carrier signal generation means, for stereo FM receivers intended for use by consumers, that meets the aforementioned technical specifications and uses standard, commercially available, relatively inexpensive components to effect increased economy in the manufacture of such receivers.

Accordingly, it is a primary object of this invention to provide economical pilot signal extraction and carrier signal generation means for an FM stereo receiver.

It is another object of this invention to provide pilot signal extraction and carrier signal generation means for an FM stereo receiver that uses only commercially available components and minimizes disturbance of amplitude and phase between the two information channels.

Briefly, in accordance with the present invention a series tuned circuit and a parallel tuned circuit are connected in series across the detector, or audio signal, output of an FM receiver and each tuned circuit is selected to resonate at the frequency of the pilot signal to be extracted. A negative resistance oscillator, which may include a tunnel diode, is connected in parallel circuit relationship with the parallel tuned circuit to enhance the selectivity thereof and provide a phase-locked oscillator. A resistor is connected in parallel circuit relationship with the series tuned circuit to substantially eliminate relative amplitude and phase disturbance between the two information channels received. Thus, the pilot signal is extracted and reproduced by the voltage appearing at the oscillator output. The extracted pilot signal is thereafter doubled to reconstitute the suppressed carrier, since the frequency of the pilot signal as originally broadcast is selected to be one half of the suppressed carrier in the FCC approved broadcast method.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing in which:

Figure 1:
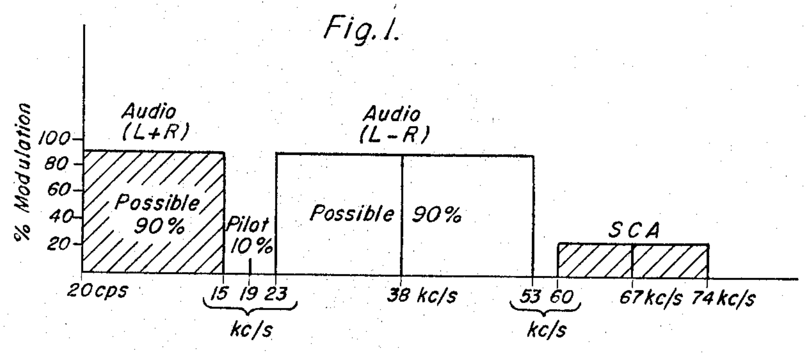
FIGURE 1 is an idealized graph of percentage modulation as a function of frequency at the discriminator output of an FM stereo receiver.

FIGURE 1 illustrates the idealized output from the FM discriminator, or audio detector, of an FM receiver as a function of frequency when the receiver is tuned to a station broadcasting in accordance with the accepted FM stereo broadcast system. In FIGURE 1 and hereinafter, the letters L and R are used to designate the left and right directions, respectively. The sound represented by the designator L originates from the left side of a sound stage or recording booth. Accordingly it is desired in the home of the consumer to reproduce the L signal by transducing means, such as a loud speaker, placed to the listener's left. Similarly, the signal designated by R originates from the right and it is desired that it be likewise reproduced at the right of the listener.

The channel designated L+R is the one ordinarily received by the conventional monaural FM receiver. Thus, the system preserves to the listener using a conventional receiver full utility for his equipment because the signals representing the left and right directions are added together as though received by a single omnidirectional microphone at the originating station.

For use by FM stereo receivers there is provided an additional channel carrying L—R information. The L—R information is amplitude modulated and appears in two sidebands disposed either side of a suppressed carrier having a frequency of 38 kilocycles per second (kc./s.). In order to recover the information contained in the L—R channel it is necessary to generate a 38 kc./s. signal corresponding to the original carrier signal which was suppressed. To this end, a pilot signal having a frequency of 19 kc./s. is provided between the L+R and L—R information channels. The pilot signal is utilized, in accordance with the present invention, by extracting it from between the information channels and using it to synchronize an oscillator operating at a frequency of 19 kc./s. and thereafter doubling the frequency to provide a signal having a frequency of 38 kc./s.

The channel designated SCA (Subsidiary Communications Authorization) has been included for the sake of completeness only and is not used for stereo reception. Accordingly, this channel will no longer be considered hereinafter. It is normally de-emphasized or filtered out by any of a plurality of means well-known in the art.

It will be noted from inspection of the grap of FIGURE 1 that the pilot signal amplitude is relatively small and may be only ⅙ that of the adjacent information channels. Additionally, the pilot signal is closely sandwiched between the two much larger amplitude information channels, being spaced only 4 kc./s. from the upper and lower ends of the L+R and L—R channels, respectively. Thus, the difficulty of extracting the pilot signals is compounded because it is both relatively small in amplitude compared to the adjacent channels and closely spaced therebetween. It is the solution of this problem by a network using conventional components to which this invention is addressed primarily.

Figures 2, 3, 4, 5, 6:
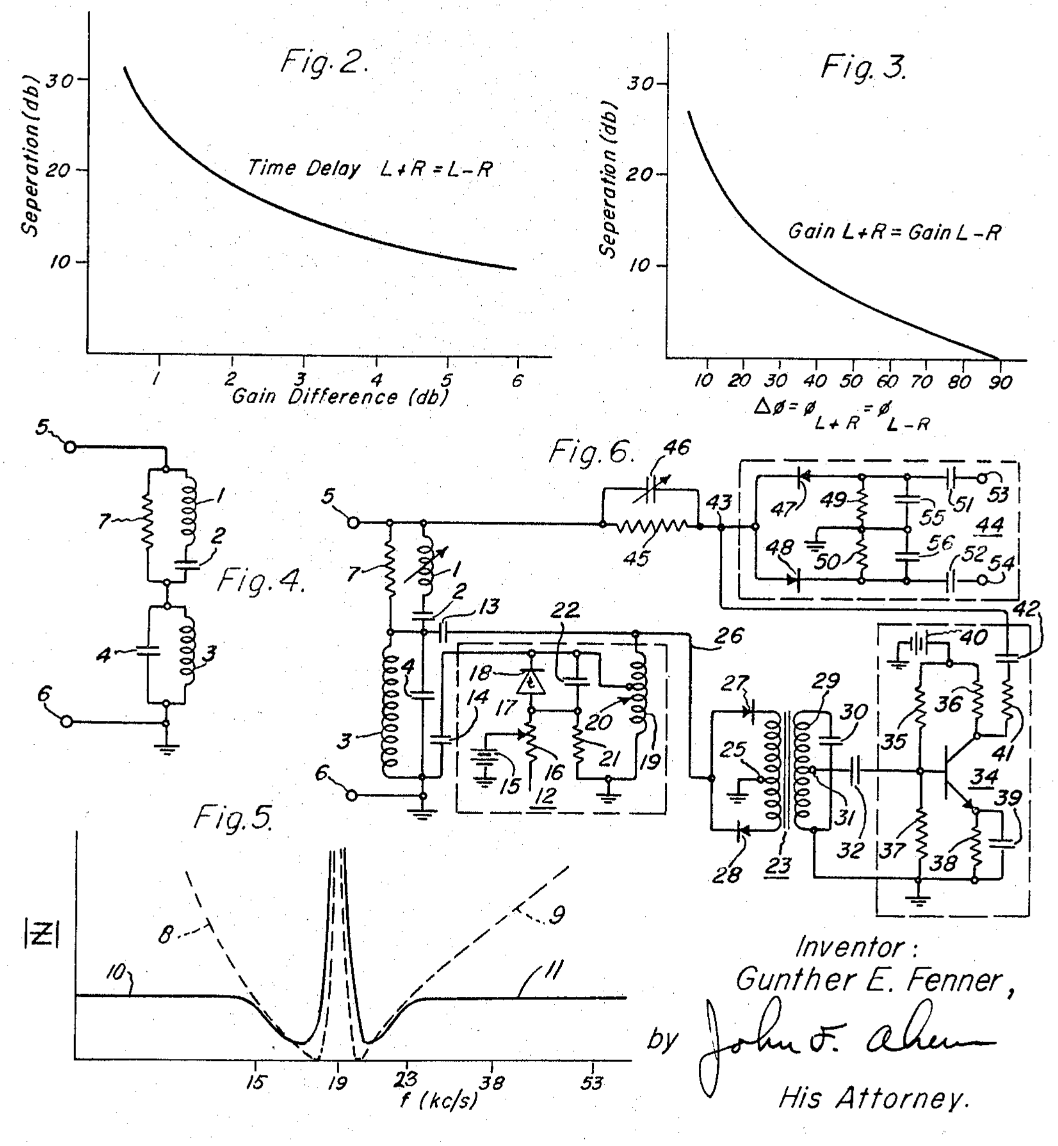
FIGURE 2 is a graph wherein channel separation is plotted as a function of difference in amplification between the two information channels of a stereo FM system.
FIGURE 3 is a graph showing channel separation as a function of a difference in phase between the two information channels.
FIGURE 4 is a schematic circuit diagram of the pilot signal extraction circuit of this invention.
FIGURE 5 is a graph of the input impedance of the circuit of FIGURE 4 as a function of frequency.
FIGURE 6 is a schematic circuit diagram of a complete stereo adaptor in accordance with the present invention.

FIGURES 2 and 3 illustrate the degradation in performance which attends a difference in gain (or attenuation) and phase, respectively, introduced by the receiver between the two channels. The two graphs are presented to emphasize the importance of maintaining a small gain difference and phase difference between the channels. This is readily discernible when it is considered that a satisfactory channel separation is generally considered to be in the order of 20 decibels (db).

FIGURE 4 illustrates schematically a circuit of considerable importance to the pilot signal extraction means of this invention. As shown, a series tuned circuit, consisting of inductor 1 and capacitor 2, is connected in series with a parallel tuned circuit, consisting of inductor 3 and capacitor 4. The combination is connected between a pair of input terminals 5 and 6 which are arranged to be connected to the discriminator output circuit of an FM receiver. Preferably, the components of both tuned circuits are selected to resonate at the frequency of the pilot signal, or 19 kc./s. Thus, the impedance of the series tuned circuit is minimized and the impedance of the parallel tuned circuit is maximized at the frequency of the pilot signal, resulting in a maximum transfer of energy from the pilot signal to the parallel tuned circuit, consisting of inductor 3 and capacitor 4. I have found that the series tuned circuit need only be resonant substantially at 19 kc./s. and deviations of up to 1 kc./s. can oftentimes be used to advantage to effect minimum disturbance of the information channel. Optimum performance precludes a similar tolerance for the parallel tuned circuit.

The circuit of FIGURE 4 includes a resistor 7 connected in parallel circuit relationship with the series tuned circuit, in accordance with the present invention. The effect of resistor 7 is more easily understood by reference to the graph of FIGURE 5 which shows a plot of the input impedance of the circuit of FIGURE 4 by a solid line when resistor 7 is included and by a dashed line to show idealized performance when resistor 7 is omitted. From the dashed lines 8 and 9 it is evident that appreciable changes in impedance are presented in the spectra of the information channels, below 15 kc./s. and above 23 kc./s., when resistor 7 is not used. Such impedance changes introduce both amplitude and phase differences between the respective channels. However, the characteristic represented by solid lines 10 and 11, that obtain when resistor 7 is used as shown in FIGURE 4, illustrate that the impedance characteristic is made substantially equal throughout the frequency spectrum of each channel and that the impedance is substantially equal throughout the spectra of both channels. Thus, disturbance of the information signal is minimized.

Optimum pilot signal extraction occurs when the product of the reactance of capacitor 2 and the reactance of inductor 3 is minimized, which requires that inductor 1 be as large as possible in order to retain the aforementioned resonant frequency relationships for both tuned circuits. The distributed capacity of inductor 1 sets an upper limit to the inductance thereof that can actually be used. By minimizing the product of the reactance of capacitor 2 and the reactance of inductor 3, the zero crossings of dashed lines 8 and 9 more closely approach the resonant frequency at 19 kc./s. and the disturbance of the channels when resistor 7 is used, as shown by lines 10 and 11, is reduced even more.

The value of resistor 7 is selected to provide a substantially constant impedance throughout the spectra of the two channels. This requires that resistor 7 have a low enough resistance value so that the input impedance of the pilot signal extraction network is essentially resistive throughout the frequency spectrum of each information channel.

FIGURE 6 is a schematic diagram of a complete stereo adapter in accordance with the present invention. The circuit includes the pilot signal extraction means of FIGURE 4 and like numbered components are similarly designated. In accordance with the present invention a negative resistance oscillator 12, which is tuned to the pilot frequency of 19 kc./s., is connected in parallel circuit relationship with the parallel tuned circuit, consisting of inductor 3 and capacitor 4. The oscillator is loosely coupled thereto by coupling capacitors 13 and 14 which also perform the function of isolating the D.C. bias means for the negative resistance device. By loosely coupled it is meant that the energy exchanged between the parallel tuned circuit and oscillator is a small fraction, preferably less than $1/10$, of the total alternating current energy in either circuit. The negative resistance device may be a tunnel diode as shown schematically.

A stable-direct current bias for oscillator 12 is provided by source 15, which may be a battery as indicated. The bias is regulated by the position of tap 17 on variable resistor 16. The bias path also includes negative resistance device 18, the lower half 19 of inductor 20 and the ground return back to source 15. Resistor 21, which normally has a very low resistance value, provides stability for the oscillator. The tuned circuit of oscillator 12 includes the bottom half 19 of inductor 20 and capacitor 22. The tuned circuit is selected to provide a resonant frequency for the oscillator at 19 kc./s.

In the preferred embodiment of my invention tap 17 on resistor 16 is varied until negative resistance device 18 is operating on a portion of its negative resistance characteristic at which oscillations are barely sustained in the absence of an input signal at terminals 5 and 6. This adjustment can be made easily with the aid of a grid dip meter or other means well-known in the art to detect oscillations. I have found that adjustment of tap 17 to the point where oscillations are barely sustained, in the absence of an input signal to terminals 5 and 6, provides the most desirable mode of operation for the circuit of my invention. In this mode of operation, oscillator 12 functions as a phase-locked oscillator accurately reproducing the pilot signal occurring across the parallel tuned circuit, including inductor 3 and capacitor 4. Additionally, the Q ($\omega L/R$ ratio) of this parallel tuned circuit is enhanced because oscillator circuit 12 neutralizes some of the positive resistance in the parallel tuned circuit. It is known that a reduction in resistance in a tuned circuit wherein the reactance values are the same increases the Q, or frequency selectivity, of the tuned circuit.

In the stereo adapter of FIGURE 5, oscillator 12 serves not only as a phase-locked oscillator and to increase the Q of the parallel tuned circuit of the pilot signal extraction circuit; but also, oscillator 12 provides a highly desirable impedance transformation. More specifically, it is desired that the parallel tuned circuit of the pilot signal extraction circuit have as high an impedance at the frequency of the pilot signal as may be attained with conventional components. Such an impedance is too high to be used directly to drive the usual variety of frequency doublers having semiconductive elements without reducing the Q of the tuned circuit. Thus, oscillator 12 makes a buffer stage unnecessary to isolate the parallel tuned circuit of the carrier signal extraction circuit. The phase-locked output signal from oscillator 12 may be used directly to drive a semiconductor frequency doubler since its source impedance is relatively low.

As shown in FIGURE 6 the frequency doubler includes a transformer 23 having a primary winding 24 with a grounded tap 25. Conductive means 26 connects the ungrounded side of the parallel tuned circuit of oscillator 12 to the extremities of winding 24 through oppositely poled diodes 27 and 28. Thus, a full-wave rectified signal synchronized in phase to the output of oscillator 12 is induced in secondary winding 29 of transformer 23. The full-wave rectified signal is smoothed to a sinusoidal oscillation having a frequency which is twice that of the pilot signal frequency by capacitor 30 which, in combination with the inductance of transformer secondary winding 29 provides a parallel tuned circuit at 38 kc./s.

A portion of the signal in the latter parallel tuned circuit is derived from tap 31 on transformer secondary winding 29 and transmitted through coupling capacitor 32 to a transistor amplifier 33. The transistor amplifier consists of a transistor 34 having suitable bias resistors 35, 36, 37 and 38 connected thereto. Capacitor 39 provides an alternating current by-pass for resistor 38 in the emitter path. Power for the operation of amplifier 33 is supplied by source 40 which is connected to resistors 35 and 36, as shown. An amplified, sinusoidal 38 kc./s. signal from amplifier 33 is coupled, through serially disposed resistor 41 and capacitor 42, to input means 43 of channel decoding means 44.

In addition to the sinusoidal 38 kc./s. signal, the output from the FM detector is supplied to input means 43 of channel decoder means 44 through resistor 45 and capacitor 46, which are connected in parallel circuit relationship. The purpose for resistor 45 and capacitor 46 is to compensate for the loss of signal strength at higher frequencies. Thus, resistor 45 and capacitor 46 comprise a high frequency pass filter that attenuates the lower frequencies more than the higher frequencies. In this way, the deficiencies in frequency response of the receiver, as reflected in the output from the detector, are compensated. It is apparent that the high pass filter is required when the circuit of FIGURE 5 is used as an adapter for existing FM receivers and that it may not be required in the case of new equipment having a substantially constant frequency response out to 53 kc./s.

Channel decoder means 44 may comprise a pair of oppositely poled diodes 47 and 48 which are connected at one end to input means 43 and at the other end returned to ground through load resistors 49 and 50, respectively. The ungrounded end of resistors 49 and 50 are connected through coupling capacitors 51 and 52, respectively, to the left channel output terminal 53 and the right output channel terminal 54, respectively. Deemphasis is provided by capacitors 55 and 56 that shunt resistors 49 and 50, respectively.

The circuit operation of channel decoder means 44 is explained in the following way. The amplitude modulated signal with center at 38 kc./s. (L—R channel) is rectified by diodes 47 and 48. Because these diodes are connected to input terminal 43 in oppositely poled relationship they will conduct at alternate half cycles of the 38 kc./s. carrier which is supplied to input means 43 through serially disposed coupling resistor 41 and capacitor 42, as described above. The instantaneous current through the diodes in the forward direction is the sum of the currents due to the L—R and L+R signals. Since the amplitude of the 38 kc./s. carrier is much larger than either of the L—R or L+R signals, the latter will appear across load resistor 49 and 50 with the same phase. The L—R modulation across the same combination will be out of phase, because the diodes conduct at successive half cycles of the 38 kc./s. carrier. The result is that in one case the L—R and L+R signals add while in the other they subtract. In this way, the L and R signals appear at their respective output terminals 53 and 54.

One particularly desirable stereo adapter using the circuit of FIGURE 6 utilized the following specific component values which are given for purpose of illustration only:

| | | | |
|---|---|---|---|
| Resistor: | | Capacitor: | |
| **7** ___ohms__ | 100K | **2** _____mmfd__ | 200 |
| **16** __do____ | 2K | **4** _____mmfd__ | 1000 |
| **21** __do____ | 30 | **13** ____mmfd__ | 22 |
| **35** __do____ | 220K | **14** ______mfd__ | 0.05 |
| **36** __do____ | 4.7K | **22** ____mmfd__ | 2000 |
| **37** __do____ | 30K | **30** ____mmfd__ | 2000 |
| **38** __do____ | 620 | **32** ______mfd__ | 0.01 |
| **41** __do____ | 20K | **39** ______mfd__ | 0.1 |
| **45** __do____ | 100K | **42** ______mfd__ | 2.2 |
| **49** __do____ | 100K | **46** ____mmfd__ | 5–80 |
| **50** __do____ | 100K | **51** ______mfd__ | 0.1 |
| Diode: | | **51** ______mfd__ | 0.1 |
| **18** ________ | 1N2939 | **55** ____mmfd__ | 700 |
| **27** ________ | 1N99 | **56** ____mmfd__ | 700 |
| **28** ________ | 1N99 | Battery: | |
| **47** ________ | 1N55A | **15** _____volts__ | 10 |
| **48** ________ | 1N55A | **40** _____do____ | 10 |

| | |
|---|---|
| Inductor **1** __________________________mh__ | 100–300 |
| Inductor **3** __________________________mh__ | 25–50 |
| Inductor **20**___________ | 70 mh at 79 kc./s. 1350T Tap at 800T, #34 wire cup core. |
| Transformer **23**________ | Pri. 400T C.T., Sec. 700T Tap at 455T cup core. |

There has been described herein an FM stereo adapter wherein the left and right channel information can be derived without requiring prior separation of the L—R and L+R channels. Operation of the circuit owes its success in large measure to the pilot signal extraction and carrier signal generation means of my invention. This is so because it is imperative that the pilot signal be extracted and the carrier frequency generated for reinsertion without introducing phase shift or amplitude difference between the respective channels. While it is possible to adjust the relative phase and amplitude between the channels with ease when the channels are separated prior to decoding, this is not the case with the system with which this invention is primarily concerned wherein the channels are at all times mixed, or composite, up to the point where a final decoding is accomplished. Thus, while the present invention can be used advantageously with any system wherein it is desired to derive a particular pilot signal from a composite signal, the present invention has particular utility when used in conjunction with a straight-through decoder (one wherein the channels are not separated until final decoding).

While only certain preferred features of the invention have been shown by way of illustration, many modifications and changes will occur to those skilled in the art. It is, therefore, to be understood that the appended claims are intended to include all such modifications and changes as fall within the true spirit and scope of my invention.

What I claim as new and desire to secure by Letters Patent of the United States is:

1. A stereo adapter for use in an FM stereo receiver which has a detector output signal including two information channels and a relatively small amplitude pilot signal having a predetermined frequency, said pilot signal being disposed between said channels and containing information required to decode the information of at least one of said channels, said adapter comprising:

(a) a series resonant circuit and a parallel resonant circuit connected in series circuit with each other and arranged to be connected across the source of said detector output signal, said parallel resonant circuit being resonant at the frequency of said pilot signal and said series resonant circuit being resonant substantially at the frequency of said pilot signal;

(b) a resistor connected in parallel circuit relationship with said series resonant circuit, the resistance value of said resistor being selected low enough to provide an essentially resistive impedance for the series combination of said series resonant circuit and said parallel resonant circuit throughout the frequency spectrum of each information channel; and (c) a negative resistance oscillator loosely coupled to said parallel resonant circuit and arranged to provide electrical oscillations at the frequency of said pilot signal which are locked in phase relative thereto.

2. The stereo adapter of claim 1 wherein said predetermined frequency is 19 kc./s.

3. A stereo adapter for use in an FM stereo receiver which has a detector output signal including two information channels and a relatively small amplitude pilot signal having a predetermined frequency, said pilot signal being disposed between said channels and containing information required to decode the information of at least one of said channels, said adapter comprising:

(a) a series resonant circuit and a parallel resonant circuit connected in series circuit with each other and arranged to be connected across the source of said detector output signal, said parallel resonant circuit being resonant at the frequency of said pilot signal and said series resonant circuit being resonant substantially at the frequency of said pilot signal;

(b) a resistor connected in parallel circuit relationship with said series resonant circuit, the resistance value of said resistor being selected low enough to provide an essentially resistive impedance for the series combination of said series resonant circuit and said parallel resonant circuit throughout the frequency specrum of each in formation channel;

(c) a negative resistance oscillator loosely coupled to said parallel resonant circuit and arranged to provide electrical oscillatons at the frequency of said pilot signal which are locked in phase relative thereto;

(d) a frequency doubler connected to said oscillator and responsive to the electrical oscillations therefrom to provide a carrier frequency signal having a frequency which is double the frequency of said electrical oscillations; and, (e) decoder means arranged to be connected to the source of said detector output signal and connected to said frequency doubler, said decoder means being responsive to said detector output signal and said carrier signal to provide decoded stereo information.

4. The stereo adapter of claim 3 wherein said predetermined frequency is 19 kc./s.

5. A stereo adapter for use in an FM stereo receiver which has a detector output signal including two information channels and a relatively small amplitude pilot signal having a frequency of 19 kc./s., said pilot signal being disposed between said channels and containing information required to decode the information of at least one of said channels, said adapter comprising:

(a) a series resonant circuit and a parallel tuned circuit connected in series circuit with each other and arranged to be connected across the source of said detector output signal, said parallel resonant circuit and said series resonant circuit being resonant at a frequency of 19 kc./s.;

(b) a resistor connected in parallel circuit relationship with said series resonant circuit, the resistance value of said resistor being selected low enough to provide an essentially resistive impedance for the series combination of said series resonant circuit and said parallel resonant circuit throughout the frequency spectrum of each information channel;

(c) a negative resistance oscillator loosely coupled to said parallel resonant circuit and arranged to provide electrical oscillations at a frequency of 19 kc./s. which are locked in phase relative to said pilot signal;

(d) a frequency doubler connected to said oscillator and responsive to the electrical oscillations therefrom to provide a carrier frequency signal having a frequency of 38 kc./s.; and, (e) decoder means arranged to be connected to the source of said detector output signal and connected to said frequency doubler, said decoder means being responsive to said detector output signal and said carrier signal to provide decoded stereo information.

No references cited.

DAVID G. REDINBAUGH, *Primary Examiner.*

R. L. GRIFFIN, *Assistant Examiner.*